(12) United States Patent
Ozaki (10) Patent No.: US 9,126,500 B2
(45) Date of Patent: Sep. 8, 2015

(54) MOTOR CONTROL DEVICE

(71) Applicant: NTN CORPORATION, Osaka (JP)

(72) Inventor: Takayoshi Ozaki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/359,430

(22) PCT Filed: Nov. 22, 2012

(86) PCT No.: PCT/JP2012/080321
§ 371 (c)(1),
(2) Date: May 20, 2014

(87) PCT Pub. No.: WO2013/077407
PCT Pub. Date: May 30, 2013

(65) Prior Publication Data
US 2014/0324265 A1    Oct. 30, 2014

(30) Foreign Application Priority Data
Nov. 24, 2011    (JP) .................................. 2011-255710

(51) Int. Cl.
| | |
|---|---|
| B60L 9/00 | (2006.01) |
| G05B 5/00 | (2006.01) |
| B60L 15/20 | (2006.01) |
| H02P 29/00 | (2006.01) |

(Continued)

(52) U.S. Cl.
CPC ............... B60L 15/20 (2013.01); B60K 7/0007 (2013.01); B60L 3/0061 (2013.01); B60L 3/06 (2013.01); H02P 29/0055 (2013.01); H02P 29/028 (2013.01); *B60L 2240/425* (2013.01); *F16H 2001/325* (2013.01); *Y02T 10/642* (2013.01); *Y02T 10/7258* (2013.01)

(58) Field of Classification Search
USPC .............................................. 701/22; 318/473
See application file for complete search history.

(56) References Cited

U.S. PATENT DOCUMENTS 5,936,820 A * 8/1999 Umemura et al. ............ 361/103
6,100,660 A * 8/2000 Ikeyama et al. ................ 318/473

(Continued)

FOREIGN PATENT DOCUMENTS

| JP | 10-210790 | 8/1998 |
| JP | 2003-304604 | 10/2003 |

(Continued)

OTHER PUBLICATIONS

International Search Report mailed Feb. 19, 2013 in corresponding International Patent Application No. PCT/JP2012/080321.

(Continued)

*Primary Examiner* — Thomas G Black
*Assistant Examiner* — Tyler Paige (57) ABSTRACT

A motor control device of controlling a motor unit that drives a wheel is provided. The device include a temperature sensor that senses a temperature of a motor coil, and a motor current limiter. The motor current limiter sets a plurality of threshold values of the temperature sensed by the temperature sensor, sets a current limiting condition that are different from each other for respective sectioned temperature ranges defined by the threshold values, and limits a current for the motor unit according to the current limiting condition for the temperature ranges to which the temperature having been sensed belongs.

7 Claims, 8 Drawing Sheets (51) Int. Cl.
  *H02P 29/02* (2006.01)
  *B60L 3/00* (2006.01)
  *B60L 3/06* (2006.01)
  *B60K 7/00* (2006.01)
  *F16H 1/32* (2006.01)

(56) References Cited

U.S. PATENT DOCUMENTS

| | | | |
|---|---|---|---|
| 8,242,722 B2 * | 8/2012 | Matsui et al. | 318/400.04 |
| 2007/0278869 A1 * | 12/2007 | Taketsuna | 310/54 |
| 2008/0054835 A1 * | 3/2008 | Tamaru | 318/634 |
| 2009/0111651 A1 * | 4/2009 | Gale et al. | 477/98 |
| 2010/0263953 A1 * | 10/2010 | Shimana | 180/65.285 |
| 2012/0277946 A1 * | 11/2012 | Yamamoto et al. | 701/22 |
| 2013/0320747 A1 * | 12/2013 | Ozaki | 301/6.5 |

FOREIGN PATENT DOCUMENTS

| | | | | |
|---|---|---|---|---|
| JP | 2003304604 A | * | 10/2003 | B60L 9/18 |
| JP | 2008-168790 | | 7/2008 | |
| JP | 2008168790 A | * | 7/2008 | |
| JP | 2009-38866 | | 2/2009 | |

OTHER PUBLICATIONS

U.S. Appl. No. 14/359,736, filed May 21, 2014, Takayoshi Ozaki, NTN Corporation.

PCT International Preliminary Report on Patentability mailed Jun. 5, 2014 in corresponding International Patent Application No. PCT/JP2012/080321.

* cited by examiner

MOTOR CONTROL DEVICE

CROSS-REFERENCE TO THE RELATED APPLICATIONS

This application is a U.S. national stage application of PCT/JP2012/080321 filed Nov. 22, 2012 and claims foreign priority benefit of Japanese Patent Application No. 2011-255710 filed Nov. 24, 2011 in the Japanese Intellectual Property Office, the contents of which are incorporated herein by reference.

BACKGROUND OF THE INVENTION

1. Field of the Invention

The present invention relates to a motor control device, and specifically relates to a motor control device that drives wheels of a vehicle, such as a battery-powered electric vehicle, a fuel cell-powered electric vehicle, or a hybrid vehicle which uses an engine in combination with electricity.

2. Description of Related Art

An electric vehicle may experience degradation in performance or malfunctions of a motor serving as a drive for a vehicle. This may significantly affect the travel performance or travel safety. In particular, for a drive device of a battery-powered electric vehicle, an IPM motor (Interior Permanent Magnet synchronous motor) that includes a neodymium magnet exhibiting a high efficiency performance is used in order to increase an endurance distance with a limited battery capacity. Further, to date, an in-wheel motor drive system has been proposed in which the temperature of a wheel bearing unit, a reducer unit and a motor unit may be measured and monitored for overload, to limit a drive current in/to the motor or a rotational frequency of the motor rotor according to the temperature measurements, for ensuring reliability (for example, Patent Document 1 listed below).

[Patent Document 1] JP Laid-open Patent Publication No. 2008-168790

SUMMARY OF THE INVENTION

In an electric vehicle, for example, travel conditions of the vehicle constantly change, and a rotational frequency of a motor rotor and current that flows through a motor coil significantly change. In particular, in an in-wheel motor type electric vehicle, a motor unit is disposed below a spring of a suspension, and thus, the motor unit is in a severe environment, that is, the motor unit is, for example, constantly vibrated. In such an adverse environment, in a case where the vehicle is continuously driven on a slope with a high torque, the temperature of the motor unit rises, and insulation performance of a motor coil is likely to be deteriorated.

In order to reduce the temperature of the motor unit, the motor unit may be cooled with water. However, since the motor unit is disposed below the spring as described above, problems arise that, for example, multiple cooling pipes are difficult to mount, the entire structure is complicated, and production cost is increased. Therefore, the motor unit is preferably cooled with air. In any case, control of the temperature of the motor unit for preventing deterioration in insulation performance of the motor coil is important for safely driving the vehicle. However, in a case where the in-wheel motor drive system measures the temperature of the motor unit and monitors the temperature for overload to limit a drive current in/to the motor as described above, driving of the vehicle may be suddenly stopped.

An object of the present invention is to provide a motor control device that can control the temperature of a motor and quickly take appropriate measures without suddenly stopping driving of the vehicle. The general aspects of the present invention will now be described using the reference signs in the figures showing embodiments of the present invention.

A motor control device according to the present invention is configured to control a motor unit 6 provided in an electric vehicle, which motor unit 6 drives a wheel 2. The motor control device includes: a temperature sensor Sa that is associated with a motor coil 78 of the motor unit 6 and is configured to sense a temperature Tc of the motor coil 78; and a motor current limiter 95 configured to set a plurality of threshold values of the temperature Tc sensed by the temperature sensor Sa, to set current limiting conditions that are different from each other for respective sectioned temperature ranges defined by the threshold values, and to limit a current for the motor unit 6 according to the current limiting condition for the temperature range to which the temperature Tc having been sensed belongs. "An electric vehicle" of the present invention includes a hybrid vehicle that uses an engine in combination with electricity.

In this configuration, the temperature sensor Sa constantly senses the temperature Tc of the motor coil 78 of the motor unit 6. For example, in a case where the electric vehicle is continuously driven on a slope with a high torque, the temperature Tc of the motor coil 78 rises. Since responsiveness is poor in the case of a temperature of the motor coil 78 being sensed by the temperature sensor Sa, the plurality of threshold values are set for the temperature Tc, and the current limiting conditions are set so as to be different among the sectioned temperature ranges defined by the threshold values. Namely, if the sensed temperature Tc is relatively lower temperature, the moderate current limiting condition is applied. In contrast, if the sensed temperature Tc is relatively higher temperature, the more strict current limiting condition is applied. The motor current limiter 95 limits a current for the motor unit 6 according to the current limiting condition for the temperature range to which the sensed temperature Tc belongs. Since the current for the motor unit 6 is thus limited, the temperature of the motor unit 6 can be minutely controlled, thereby preventing deterioration in insulation performance of the motor coil 78. Thus, sudden obstruction of driving of a vehicle can be avoided.

If a time difference $dTc/dt$ of a motor coil temperature obtained by differentiating the temperature Tc with respect to a time $t$ indicates a positive value, the motor current limiter 95 may allow an allowable upper limit of the time differences $dTc/dt$ of the motor coil temperature to vary depending on the sectioned temperature ranges. Since the allowable upper limit of the time difference $dTc/dt$ of the motor coil temperature varies depending on the sectioned temperature ranges, the temperature of the motor unit 6 can be minutely controlled. For example, in a case where the sensed temperature Tc is relatively low, even when the temperature Tc changes at a high rate, insulation performance of the motor coil 78 may not be immediately deteriorated. Therefore, in such case, the allowable upper limit of $dTc/dt$ can be set relatively high. On the other hand, as the sensed temperature Tc becomes high, even when the temperature Tc gently changes, insulation performance of the motor coil 78 may be likely to be deteriorated. Therefore, in such case, the allowable upper limit of the time difference $dTc/dt$ of the motor coil temperature can be set to another value according to the sectioned temperature range, to control the temperature of the motor unit 6, thereby preventing deterioration in insulation performance of the motor coil 78.

The motor current limiter 95 may set, for the respective temperature ranges to one of which the temperature Tc having been sensed belongs, the allowable upper limits of the time difference dTc/dt of the motor coil temperature obtained by differentiating the temperature Tc with respect to the time t so that the allowable upper limit for the temperature range with higher temperature is smaller than the allowable upper limit for the temperature range with lower temperature. Since the allowable upper limit of the time difference dTc/dt of the motor coil temperature is thus set, the temperature of the motor unit 6 can be accurately controlled with ease. Namely, if the motor coil temperature Tc is relatively low, insulation performance of the motor coil 78 is rarely immediately deteriorated. Therefore, even when responsiveness in temperature detection is poor, rapid rising of the temperature Tc can be allowed. On the other hand, if the motor coil temperature Tc is relatively high, insulation performance of the motor coil 78 is likely to be deteriorated. Therefore, the rapid rising of the temperature Tc is strictly limited. The temperature ranges defined by the threshold values may be sectioned into smaller ranges, and the allowable upper limit of dTc/dt may be linearly reduced with increasing the temperature. In this case, the temperature of the motor unit 6 can be more minutely controlled.

The motor current limiter 95 may limit the dTc/dt by controlling a current for the motor unit 6. When the motor current limiter 95 performs control for reducing a current for the motor unit 6 at a certain motor coil temperature Tc, the time difference dTc/dt of the motor coil temperature tends to be constant or to decrease. When such a tendency of dTc/dt is detected, that is, when the time difference dTc/dt of the motor coil temperature becomes less than or equal to 0, the control for reducing a motor current is stopped even though the temperature Tc does not decrease to a predetermined value. Therefore, driving of the motor unit 6 is prevented from being rapidly limited. Even in a case where the motor coil temperature Tc starts rising due to the control by the motor current limiter 95 being stopped, if the sensed temperature Tc is higher than or equal to the threshold value set for the temperature range to which the sensed temperature Tc belongs, and dTc/dt exceeds the upper limit value for the temperature range to which the sensed temperature Tc belongs, control for reducing a current for the motor unit 6 is performed again. Therefore, even if, when the time difference dTc/dt of the motor coil temperature becomes less than or equal to 0, control for reducing the motor current is stopped, overload can be assuredly prevented.

The motor current limiter 95 may include a determination unit 39 configured to determine whether or not the temperature Tc sensed by the temperature sensor Sa exceeds one of the threshold values. An abnormalities notifier 41 may be provided which is configured to send, when the determination unit determines that the temperature Tc having been sensed exceeds a predetermined threshold value among the plurality of threshold values, information indicating an abnormality of the motor unit 6, to an ECU 21 that serves as an electronic control unit for performing general control of the vehicle. In this case, when the information indicating the abnormality of the motor unit 6 is sent to the ECU 21, the ECU 21 is allowed to appropriately perform general control of the vehicle. The motor current limiter 95 may be provided in the ECU 21.

The motor unit 6 may operate to individually drive a wheel 2 of the electric vehicle. An in-wheel motor drive system 8 may be configured to have the motor unit 6 which is partly or entirely disposed within the wheel 2.

The in-wheel motor drive system 8 may include the motor unit 6, a wheel bearing unit 4, and a reducer unit or reduction gear 7. Reliability of the wheel bearing unit 4, the reducer unit 7, and the motor unit 6 is an urgent concern for the in-wheel motor drive system 8 which, due to its smaller size, involves reduction of materials to be used and rapid rotation of the motor unit 6. In particular, the temperature of the motor coil 78 is sensed and a current for the motor unit 6 is limited according to the current limiting condition for the temperature range to which the sensed temperature Tc belongs, whereby the temperature of the motor unit 6 can be minutely controlled and deterioration in insulation performance of the motor coil 78 can be prevented.

A reducer unit 7 configured to reduce a speed of rotation of the motor unit 6, may be provided. The reducer unit 7 may be a cycloidal reducer having a high reduction ratio of 4 or greater. This allows for provision of a smaller motor unit 6, thus achieving reduction in dimensions of the unit. With such a significant reduction ratio, a smaller motor unit 6 may involve rapid rotation.

Any combination of at least two features, disclosed in the appended claims and/or the specification and/or the accompanying drawings should be construed as included within the scope of the present invention. In particular, any combination of two or more of the appended claims should be construed as encompassed within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF EMBODIMENTS

Figure 1:
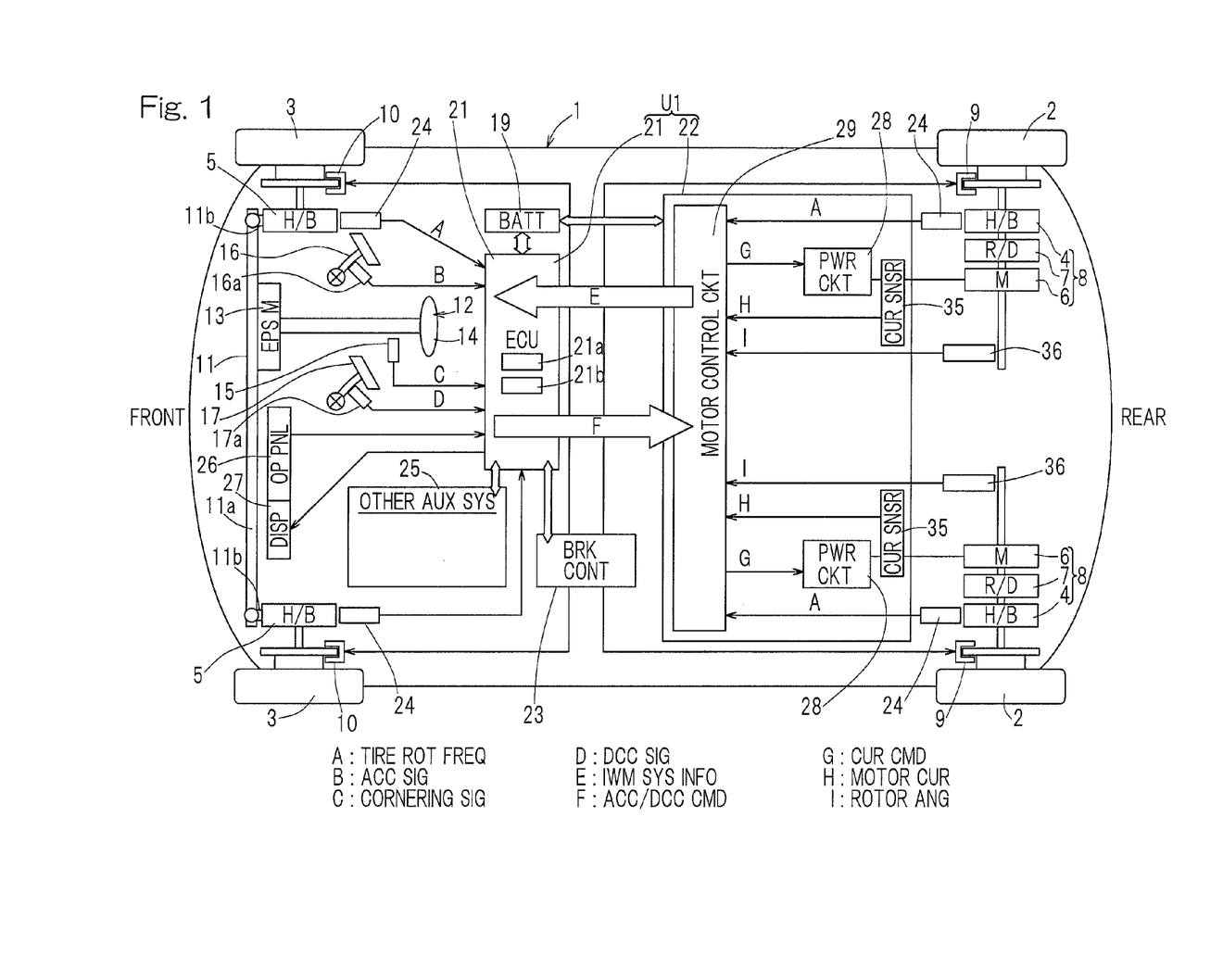
FIG. 1 is a block diagram of a schematic configuration of an electric vehicle, as viewed from top, according to a first embodiment of the present invention.

A first embodiment of the present invention will now be described with reference to FIG. 1 to FIG. 9. A motor control device according to the present embodiment is mounted to an electric vehicle. The electric vehicle is a four-wheel vehicle that includes a vehicle body 1 with left and right rear wheels 2 and left and right front wheels 3, with the rear wheels 2 being drive wheels and the front wheels 3 being steered driven wheels. The drive wheels 2 and the driven wheels 3, both equipped with tires, are supported by the vehicle body 1 via respective wheel bearings units 4, 5. In FIG. 1, the wheel bearing units 4, 5 are labeled with "H/B" which is an abbreviation for hub bearing. The left and right drive wheels 2, 2 are driven by respective independent traction motor units 6, 6. Rotation of each motor unit 6 is transmitted via a reducer unit 7 and the wheel bearing unit 4 to the wheel 2. The motor unit 6, the reducer unit 7, and the wheel bearing unit 4 are integrally assembled with each other to form an in-wheel motor drive system 8 that is partly or entirely disposed within the wheel 2. The in-wheel motor drive system 8 may be referred to as an in-wheel motor unit. The motor unit 6 may, without the interposition of the reducer unit 7, directly drive the wheel 2 into rotation. The wheels 2, 3 are equipped with respective electromechanical brakes 9, 10.

The left and right front steered wheels 3, 3 are turnable via a turning mechanism 11 and are steered with a steering mechanism 12. The turning mechanism 11 includes left and right knuckle arms 11b, 11b holding the respective wheel bearing units 5 and also includes a tie rod structure 11a configured to be laterally displaced to change the angles of the left and right knuckle arms 11b, 11b. The lateral movement of the turning mechanism 11 may be caused by a command from the steering mechanism 12, which drives an EPS (Electric Power Steering) motor 13, and via a rotary to linear motion converter mechanism (not shown). A steering angle sensor 15 is configured to sense a steering angle. The output of the steering angle sensor 15 is sent to an ECU 21 in which the sensed information may be used to generate an accelerating/decelerating command for left and right wheels.

A control system will be described. A control device U1 as shown in FIG. 1 includes the ECU 21 which is an electronic control unit configured to perform general control of the vehicle and an inverter unit 22 configured to perform control of the traction motor units 6, 6 according to commands from the ECU 21. The vehicle body 1 is equipped with the ECU 21, the inverter unit 22, and a braking controller 23. The ECU 21 may include a computer, programs that may be executed by the computer, and various electronic circuits.

The ECU 21 may be generally divided, in terms of their functions, into a drive control subunit 21a and a general control subunit 21b. The drive control subunit 21a is configured to generate an accelerating/decelerating command, which will influence the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. In addition, the drive control subunit 21a may be configured to correct the accelerating/decelerating command to be sent, based on information indicating the rotational frequency of tire(s) produced from rotation sensor(s) 24 that is/are operatively associated with the wheel bearing units 4, 5 for the respective wheels 2, 3 and/or information produced from various sensors that may be mounted to the vehicle. The accelerator manipulation unit 16 includes an accelerator pedal and a sensor 16a configured to sense the depression of the accelerator pedal to generate the aforementioned accelerating signal. The brake manipulation unit 17 includes a brake pedal and a sensor 17a configured to sense the depression of the brake pedal to generate the aforementioned decelerating signal.

The general control subunit 21b of the ECU 21 is configured to send the decelerating signal produced from the brake manipulation unit 17 to the braking controller 23, control various auxiliary systems 25, process input signals from an operation panel 26 on a console, cause a display 27 to show information, and/or etc. Examples of the auxiliary systems 25 include an air conditioner, a lamp, a wiper, a GPS, and an airbag. In the description herein, the auxiliary systems 25 are indicated in general by a single block.

The braking controller 23 is configured to send a braking command to the brakes 9, 10 equipped to the wheels 2, 3, according to the decelerating command received from the ECU 21. Commands related to braking produced from the ECU 21 may include, other than commands generated based on the decelerating signal produced from the brake manipulation unit 17, a command generated by a safety enhancement subunit that may be included in the ECU 21. The braking controller 23 may also include an anti-lock-braking system. The braking controller 23 may include electronic circuits and/or a microcomputer.

The inverter unit 22 includes power circuitries 28, of which one may be provided for each of the motor units 6, and a motor control circuitry 29 configured to control the power circuitries 28. A common motor control circuitry 29 may be provided for different power circuitries 28. Independent motor control circuitries 29 may be provided for respective different power circuitries 28. The common motor control circuitry 29 will be configured to control the different power circuitries 28 independently of each other, for example, to achieve different motor torques. The motor control circuitry 29 may be configured to send various information related to the in-wheel motor 8 (which may be referred to as "IWM system information") held by the motor control circuitry 29, such as a variety of detected values or various control values, to the ECU.

Figure 2:
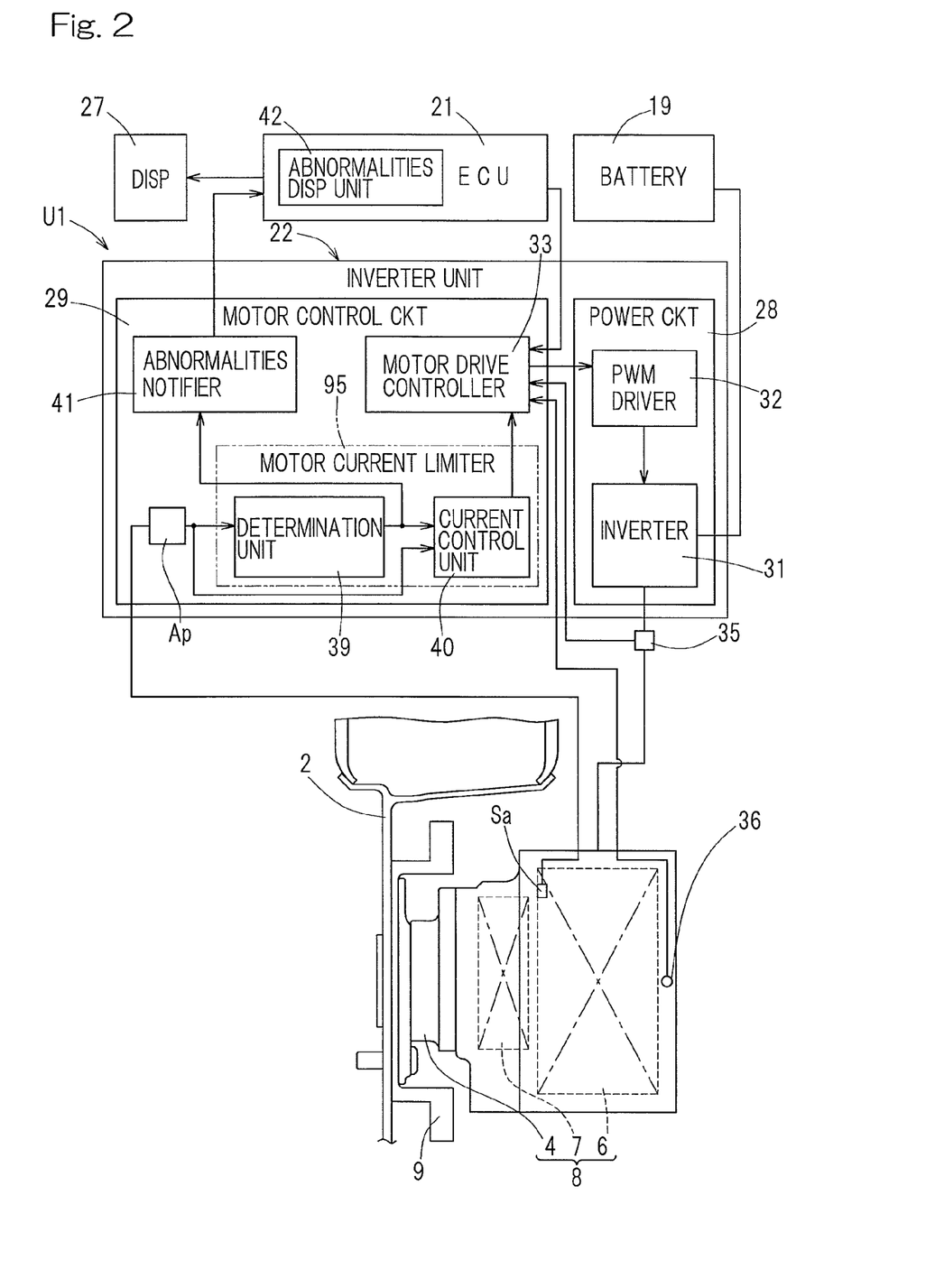
FIG. 2 is a block diagram of a schematic configuration of a control device for a drive motor of the electric vehicle.

FIG. 2 is a block diagram of a schematic configuration of a control device for a drive motor of the electric vehicle. The power circuitry 28 includes an inverter 31 configured to convert a DC power from a battery unit 19 into a three-phase AC power used to drive the motor unit 6 and also includes a PWM driver 32 configured to control the inverter 31. The motor unit 6 may include a three-phase synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may include a motor drive controller 33 which serves as a basic control component. The motor drive controller 33 may be configured to receive the accelerating/decelerating command such as a torque command from the ECU which serves as an upper-level control unit, convert the accelerating/decelerating command into a current command, and send the current command to the PWM driver 32 of the power circuitry 28.

The motor drive controller 33 may be configured to obtain a motor current that flows from the inverter 31 to the motor unit 6, with a current sensor 35, and perform a current feedback control. The motor drive controller 33 may be configured to obtain a rotational angle of a rotor of the motor unit 6, with an angle sensor 36, and perform a vector control.

In the present embodiment, the motor control circuitry 29 having the above structure may include a motor current limiter 95 and an abnormalities notifier 41 described below, and the ECU 21 may include an abnormalities display unit 42. Furthermore, temperature sensors Sa may be associated with respective motor coils 78 (FIG. 6) of the motor units 6, each of which is configured to sense a temperature Tc of the motor coil 78.

Figure 4A:
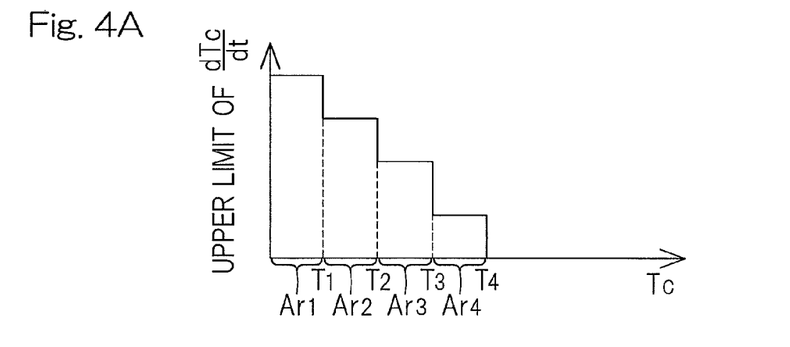
FIG. 4A shows a graph representing a relationship between motor coil temperature and upper limit values of dTc/dt.

As shown in FIG. 2, the motor current limiter 95 is configured to limit a current for the motor unit 6. The motor current limiter 95 includes a determination unit 39 and a current control unit 40, described below. As shown in FIG. 4A, a plurality of threshold values (in the present embodiment, $T_1$, $T_2$, $T_3$, $T_4$) are set or provided for the temperature Tc sensed by the temperature sensor Sa. Those threshold values T1 to T4 define temperature ranges Ar1 to Ar4, and different current limiting conditions are set or provided for the temperature ranges Ar1 to Ar4, respectively. The current control unit 40 of the motor current limiter 95 limits a current for the motor unit 6 according to the current limiting condition for one of the temperature ranges Ar1 to Ar4 to which the sensed temperature Tc belongs. In the present embodiment, as the current limiting condition, an upper limit value (allowable upper limit) is set for a time difference dTc/dt of a motor coil temperature, which is obtained by differentiating the temperature Tc with respect to the time t. Furthermore, the current limiting condition includes a plurality of current limiting conditions, that is, the allowable upper limit of dTc/dt is set or provided for each of the sectioned temperature ranges Ar1 to Ar4. A value sensed by the temperature sensor Sa is amplified by an amplifier Ap. Based on a value inputted from the amplifier Ap, dTc/dt may be constantly monitored. As a result, the current control unit 40 can limit the current according to the monitored time difference dTc/dt of the motor coil temperature.

Specifically, if the temperature Tc having been sensed is lower than or equal to $T_1$, a threshold value $T_1$ is selected, which is relatively lower temperature, as the threshold temperature. Then, as the upper limit of dTc/dt, the upper limit value of dTc/dt for the temperature range Ar1 to which the sensed temperature Tc belongs is selected. If the temperature Tc having been sensed is higher than $T_1$ and lower than or equal to $T_2$, a threshold value $T_2$, which is greater than the threshold value $T_1$ and less than a threshold values $T_3$, is selected as the threshold temperature. The upper limit value of dTc/dt for the temperature range Ar2 to which the sensed temperature Tc belongs is selected, which is less than the upper limit value of dTc/dt for the temperature range Ar1. In this manner, the motor current limiter 95 selects one of the allowable upper limits of dTc/dt according to the temperature range of the sectioned temperature ranges Ar1 to Ar4, to which the sensed temperature Tc belongs, if the time difference dTc/dt of the motor coil temperature indicates a positive value.

Figure 4B:
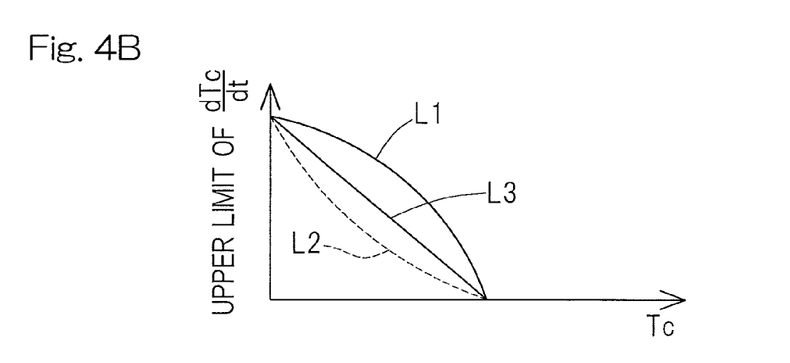
FIG. 4B shows a graph representing a relationship between motor coil temperature and upper limit values of dTc/dt in which a temperature range is sectioned by threshold values into smaller ranges.

In the example of FIG. 4A, the upper limit values of the time difference dTc/dt of the motor coil temperature for the respective temperature ranges Ar1 to Ar4 to any of which the sensed temperature Tc belongs are set or provided so that the higher the temperature of the range Ar1, Ar2, Ar3 or Ar4 is, the smaller the upper limit value is. In other words, the upper limit value is reduced stepwise with increasing the temperature. As shown in FIG. 4B, the temperature range may be sectioned by the threshold values into smaller ranges such that the upper limit value of dTc/dt is reduced with increasing temperature so as to represent a quadratic function curve forming a convex curve like a curve L1 in FIG. 4B. Further, the temperature range may be sectioned by the threshold values into smaller ranges such that the upper limit value of dTc/dt is reduced with increasing temperature so as to represent a quadratic function curve forming a concave curve like a curve L2. Furthermore, the upper limit value of dTc/dt may be linearly reduced with increasing temperature as represented by a straight line L3. In these cases, the temperature of the motor unit 6 can be controlled more minutely or finely as compared to a case shown in FIG. 4A. In particular, in the case that the upper limit value of dTc/dt is set so as to represent the solid line curve L1, the motor coil temperature Tc can be allowed to rapidly rise until the temperature Tc reaches the relatively higher temperature. Therefore, the current control unit 40 is allowed to control a current with ease without affecting driving of the vehicle.

The temperature sensor Sa may include a thermistor. The thermistor may be fixed to the motor coil 78 in contact therewith, thereby enabling the temperature Tc of the motor coil 78 to be sensed. In this example, as shown in FIG. 2 and FIG. 3, a value sensed by the thermistor may be amplified by the amplifier Ap, and the determination unit 39 may make determination based on the amplified value.

The determination unit 39 constantly determines whether or not the temperature Tc sensed by the temperature sensor Sa exceeds one of the threshold values $T_1$ to $T_4$ that is set for the temperature range to which the sensed temperature Tc belongs. Also, the determination unit 39 constantly determines whether or not the time difference dTc/dt of the motor coil temperature exceeds the upper limit value for the temperature range to which the sensed temperature Tc belongs. The threshold values $T_1$ to $T_4$ are determined in advance through experiments and/or simulations, based on a relationship, between the temperature of the motor coil 78 and the time, which causes deterioration in insulation performance of the motor coil 78. Whether or not the motor coil 78 has been insulated, can be determined by comparing a motor current value against a motor voltage applied to the motor unit 6, with a reference value obtained when no insulation occurs. The voltage applied to the motor is sensed by a voltage sensor (not shown) which may be disposed following the current sensor 35, and the motor current value is obtained by the current sensor 35. The threshold values having been set may be stored as a table in a storage unit (not shown) in a rewritable manner.

Figure 3:
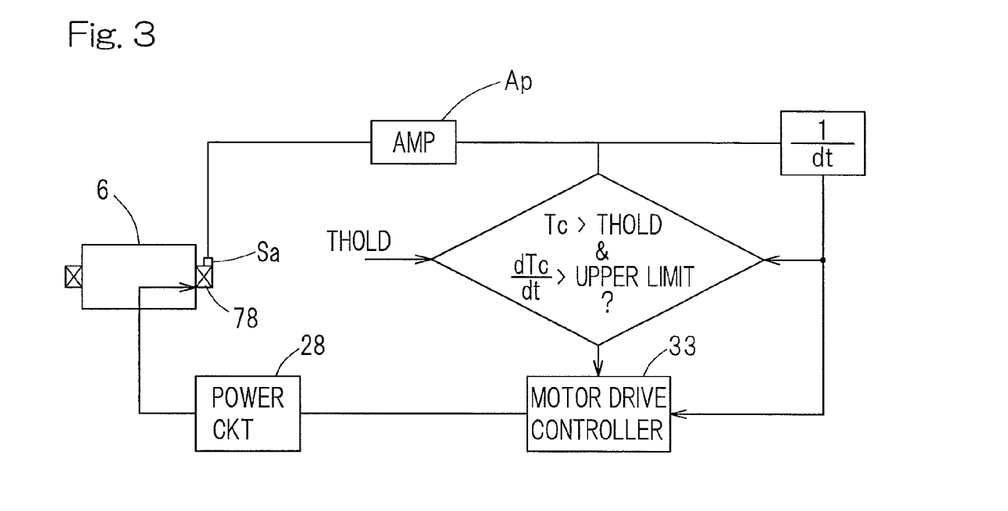
FIG. 3 is a block diagram of a control system of the electric vehicle.

As shown in FIG. 2 and FIG. 3, when the determination unit 39 determines that the temperature Tc of the motor coil 78 having been sensed exceeds the threshold value set for the temperature range to which the sensed temperature Tc belongs, and that dTc/dt exceeds the upper limit value for the temperature range to which the sensed temperature Tc belongs, the current control unit 40 commands, through the motor drive controller 33, the power circuitry 28 to reduce a current for the motor unit 6. The motor current may be reduced by a predefined proportion (for example, 90%) of a most recent current, or reduced to a predefined value. Thus, the motor coil temperature shows a tendency to be constant or reduced.

When such a tendency is detected, that is, when the time difference dTc/dt of the motor coil temperature becomes less than or equal to 0, the control for reducing a motor current is stopped even though the temperature Tc does not decrease to a predetermined value. Therefore, driving of the motor unit 6 is prevented from being rapidly limited. That dTc/dt is less than or equal to 0 means that a gradient of the temperature Tc represents 0 or less value in any minute time period. Assuming that a motor current is reduced until the temperature of the motor coil 78 decreases to some degree, driving of the vehicle may be obstructed due to driving of the motor unit 6 being rapidly limited. In contrast, by detecting the tendency of temperature reduction to stop limiting of current as described above, a problem associated with rapid limiting of driving of the motor unit 6 can be overcome.

Even in a case where the temperature Tc of the motor coil 78 starts rising due to control by the motor current limiter 95 being stopped, if the temperature Tc is higher than or equal to the threshold value set for the temperature range to which the temperature Tc belongs, and dTc/dt exceeds the upper limit value for the temperature range to which the temperature Tc having been sensed belongs, the current control unit 40 performs control so as to reduce the current for the motor unit 6 again. Therefore, even if, when a rate at which the temperature rises becomes less than or equal to 0, control for reducing the motor current is stopped, overload can be assuredly prevented. Specifically, in FIG. 5A and FIG. 5B, a relationship between the temperature Tc of the motor coil 78 of the motor unit 6 of the electric vehicle and the time t is illustrated.

Figure 5A:
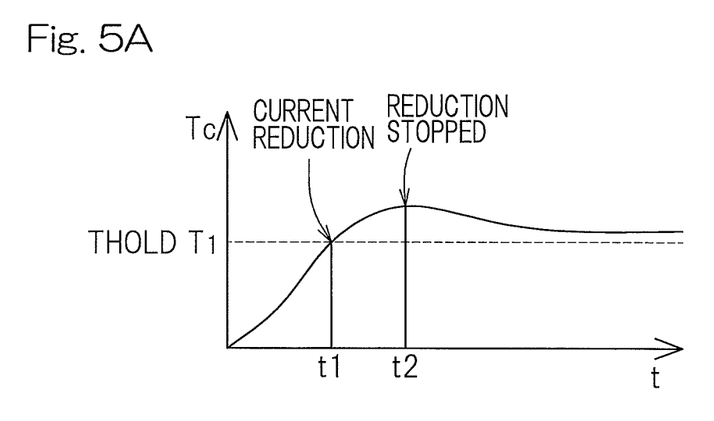
FIG. 5A shows a graph representing an exemplary relationship between motor coil temperature of the motor of the electric vehicle and time.

In FIG. 5A, at time t1 when the temperature Tc of the motor coil 78 has risen, the determination unit 39 determines that the temperature Tc of the motor coil 78 exceeds the threshold value $T_1$ and dTc/dt exceeds the upper limit value. According to the determination result, the current control unit 40 commands, through the motor drive controller 33, the power circuitry 28 to reduce the current for the motor unit 6. The motor drive controller 33 sends, in response to a command received from the current control unit 40, a current command to the PWM driver 32 of the power circuitry 28. The power circuitry 28 reduces a current to be supplied to the motor unit 6.

At time t2, when dTc/dt becomes "0" (the temperature Tc becomes constant), the current control unit 40 stops control for reducing the current for the motor unit 6. In the example of FIG. 5A, dTc/dt represents a minus value (the temperature Tc decreases) at and after the time t2. Thus, even if the motor temperature Tc is higher than or equal to the threshold value $T_1$, the current control unit 40 stops the control for reducing the motor current without waiting for the situation in which the sensed temperature Tc falls below the threshold value $T_1$.

Figure 5B:
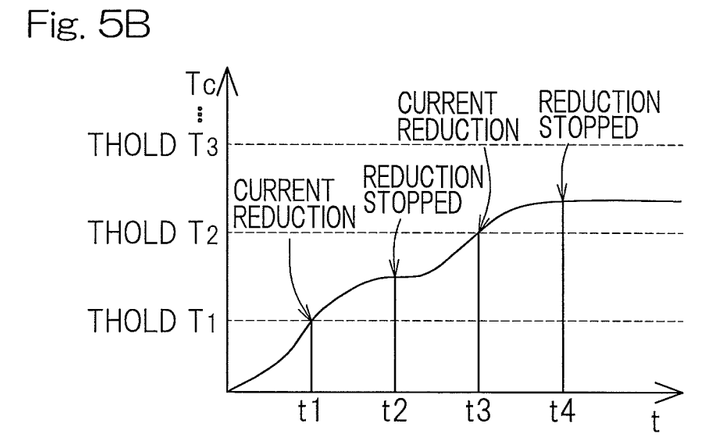
FIG. 5B shows a graph representing another exemplary relationship between motor coil temperature of the motor of the electric vehicle and time.

In the example of FIG. 5B, at time t1, in response to the determination result from the determination unit 39, the current control unit 40 commands, through the motor drive controller 33, the power circuitry 28 to reduce the current for the motor unit 6. At and after the time t2, the temperature Tc of the motor coil 78 rises again due to the control by the motor current limiter 95 being stopped. At time t3, the determination unit 39 determines that the temperature Tc of the motor coil 78 exceeds the threshold value $T_2$ and dTc/dt exceeds the upper limit value. In response to the determination result, the current control unit 40 commands, through the motor drive controller 33, the power circuitry 28 to reduce the current for the motor unit 6 similarly as described above. At time t4, dTc/dt represents "0" (the temperature Tc becomes constant), whereby the current control unit 40 stops control for reducing the current for the motor unit 6.

In the example of FIG. 5B, at and after the time t4, dTc/dt represents "0". Therefore, even if the temperature Tc is higher than the threshold value $T_2$, the current control unit 40 stops the control for reducing the current for the motor unit 6 without waiting for the situation in which the sensed temperature Tc falls below the threshold value $T_2$. When the temperature Tc of the motor coil 78 starts rising again due to the control by the motor current limiter 95 being stopped, the current control unit 40 performs control for reducing the current for the motor unit 6 according to the determination based on the following threshold value $T_3$ and a result of determination based on dTc/dt.

In each of the case of FIG. 5A and the case of FIG. 5B, as the motor current limiter 95 performs control for reducing a current for the motor unit 6, the time difference dTc/dt of the motor coil temperature Tc shows a tendency to be constant or reduced. When such a tendency of dTc/dt is detected, that is, when the time difference dTc/dt of the motor coil temperature Tc becomes less than or equal to 0, the control for reducing a motor current is stopped even though the temperature Tc does not decrease to a predetermined value, thereby preventing driving of the motor unit 6 from being rapidly limited.

Even in a case where the motor coil temperature Tc starts rising due to the control by the motor current limiter 95 being stopped, if the temperature Tc having been sensed is higher than or equal to the threshold value set for the temperature range to which temperature Tc belongs, and dTc/dt exceeds the upper limit value for the temperature range to which the sensed temperature Tc belongs, the control for reducing a current for the motor unit 6 is performed again. Therefore, since when the time difference dTc/dt of the motor coil temperature Tc becomes less than or equal to 0, the control for reducing the motor current is stopped, overload can be assuredly prevented.

As shown in FIG. 2, the abnormalities notifier 41 is configured to send information indicating an abnormality to the ECU 21 when the determination unit 39 determines that the temperature Tc exceeds a predetermined threshold value (for example, $T_2$) among the plurality of threshold values. The abnormalities display controller 42, which may be included in the ECU 21, is configured to, in response to the information indicating the abnormality of the motor unit 6 produced from the abnormalities notifier 41, cause the vehicle driver display 27 to show a presentation that indicates the abnormality. The presentation that can be shown on the display 27 may include a presentation with letters and/or symbols, such as an icon.

Figure 6:
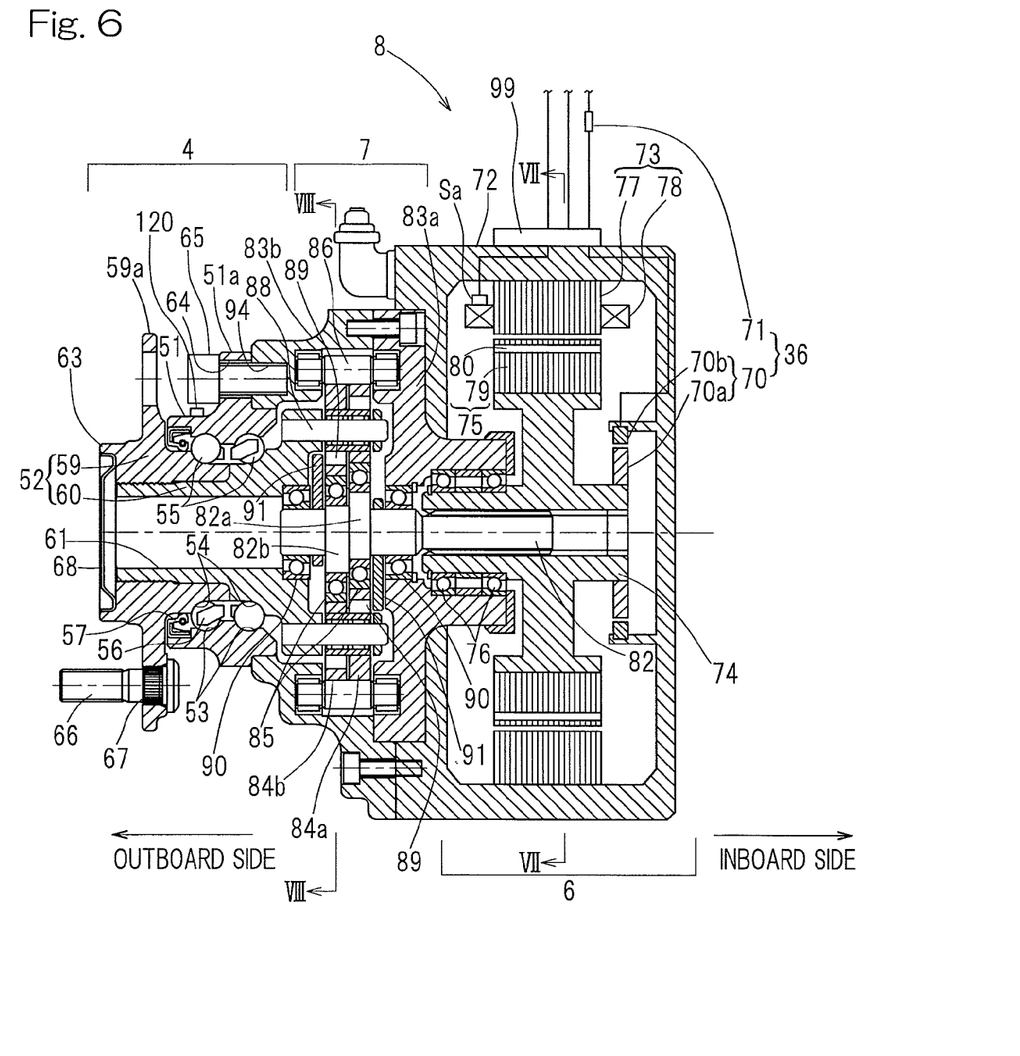
FIG. 6 is a front cut-away view of an in-wheel motor drive system for the electric vehicle.

The following advantages or effects that may be achieved will be described with reference to FIG. 2. In this configuration, the temperature sensor Sa constantly senses the temperature Tc of the motor coil 78 (FIG. 6). For example, in a case where the electric vehicle is continuously driven on a slope in a state where a torque is high, the temperature Tc of the motor coil 78 (FIG. 6) rises. Since responsiveness is poor in the case of a temperature of the motor coil 78 (FIG. 6) being sensed by the temperature sensor Sa, the plurality of threshold values are set for the temperature Tc, and the current limiting conditions are set so as to be different among the sectioned temperature ranges defined by the threshold values. Namely, when the sensed temperature Tc is relatively lower temperature, the moderate current limiting condition is applied, that is, the upper limit value of dTc/dt is relatively large. In contrast, the higher the sensed temperature Tc is, the more strict current limiting condition is applied, that is, the upper limit value of dTc/dt to be applied is relatively small. The motor current limiter 95 limits a current for the motor unit 6 according to the current limiting condition for the temperature range to which the sensed temperature Tc belongs. Since the current for the motor unit 6 is thus limited, the temperature of the motor unit 6 can be minutely controlled, thereby preventing deterioration in insulation performance of the motor coil 78 (FIG. 6). Thus, sudden obstruction of driving of a vehicle can be avoided.

Provided that the time difference dTc/dt of the motor coil temperature obtained by differentiating the temperature Tc with respect to the time t represents a positive value, the motor current limiter 95 selects one of the allowable upper limits of the time differences dTc/dt of the motor coil temperature according to the temperature range of the sectioned temperature ranges, to which the sensed belongs. Since the allowable upper limit of the time difference dTc/dt of the motor coil temperature varies according to the sectioned temperature ranges, the temperature of the motor unit 6 can be minutely controlled. For example, in a case where the sensed temperature Tc is relatively low, even when the temperature Tc sharply changes, insulation performance of the motor coil 78 (FIG. 6) may not be immediately deteriorated. Therefore, in such case, the allowable upper limit of dTc/dt can be set relatively high. On the other hand, as the sensed temperature Tc becomes higher, even when the temperature Tc gently changes, insulation performance of the motor coil 78 (FIG. 6) is likely to be deteriorated. Therefore, in such case, the allowable upper limit of the time difference dTc/dt of the motor coil temperature can be set to another value according to the sectioned temperature range, to control the temperature of the motor unit 6, thereby preventing deterioration in insulation performance of the motor coil 78 (FIG. 6). Further, since the allowable upper limits of dTc/dt for the respective temperature ranges to any of which the sensed temperature Tc belongs are set so that the higher the temperature of the range is, the smaller the upper limit value is, the temperature of the motor unit 6 can be easily controlled.

The motor control circuitry 29 of the inverter unit 22 includes the motor current limiter 95, to perform determination associated with a sensed temperature near the motor unit 6. Therefore, this arrangement is more advantageous in terms of wire routing. Also, in this configuration, an appropriate control can be initiated more quickly than with a configuration of the ECU 21 including the motor current limiter 95, thus promptly avoiding various driving problems. Furthermore, with the above configuration, the load on the ECU 21, whose complexity is increasing hand-in-hand with its sophistication, can be reduced.

The ECU 21 performs general, integrated control of the vehicle.

Thus, when the motor current limiter 95 of the inverter unit 22 detects an abnormality in the motor coil 78 (FIG. 6), the ECU 21 is notified of the abnormality of the motor unit 6, whereby the ECU 21 can appropriately perform general control of the vehicle. Further, the ECU 21 is an upper-level control unit which may send a drive command to the inverter unit 22. Thus, an urgent control performed by the inverter unit 22 may be followed by a more appropriate control of drive which is performed by the ECU 21.

As shown in FIG. 6 as an example, the in-wheel motor drive system 8 includes the wheel bearing unit 4, the motor unit 6 and the reducer unit 7 interposed between the wheel bearing unit 4 and the motor unit 6, in which the hub of the drive wheel 2 (FIG. 2) supported by the wheel bearing unit 4 is coaxially coupled with a rotational output shaft 74 of the motor unit 6 (FIG. 6). Preferably, the reducer unit 7 has a reduction ratio of 4 or greater. The reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. In this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectioned shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7. The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 64.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

The motor unit 6 includes a radial-gap type, IPM motor (e.g., an Interior Permanent Magnet synchronous motor) that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of an inboard housing 83a of the reducer unit 7.

Figure 7:
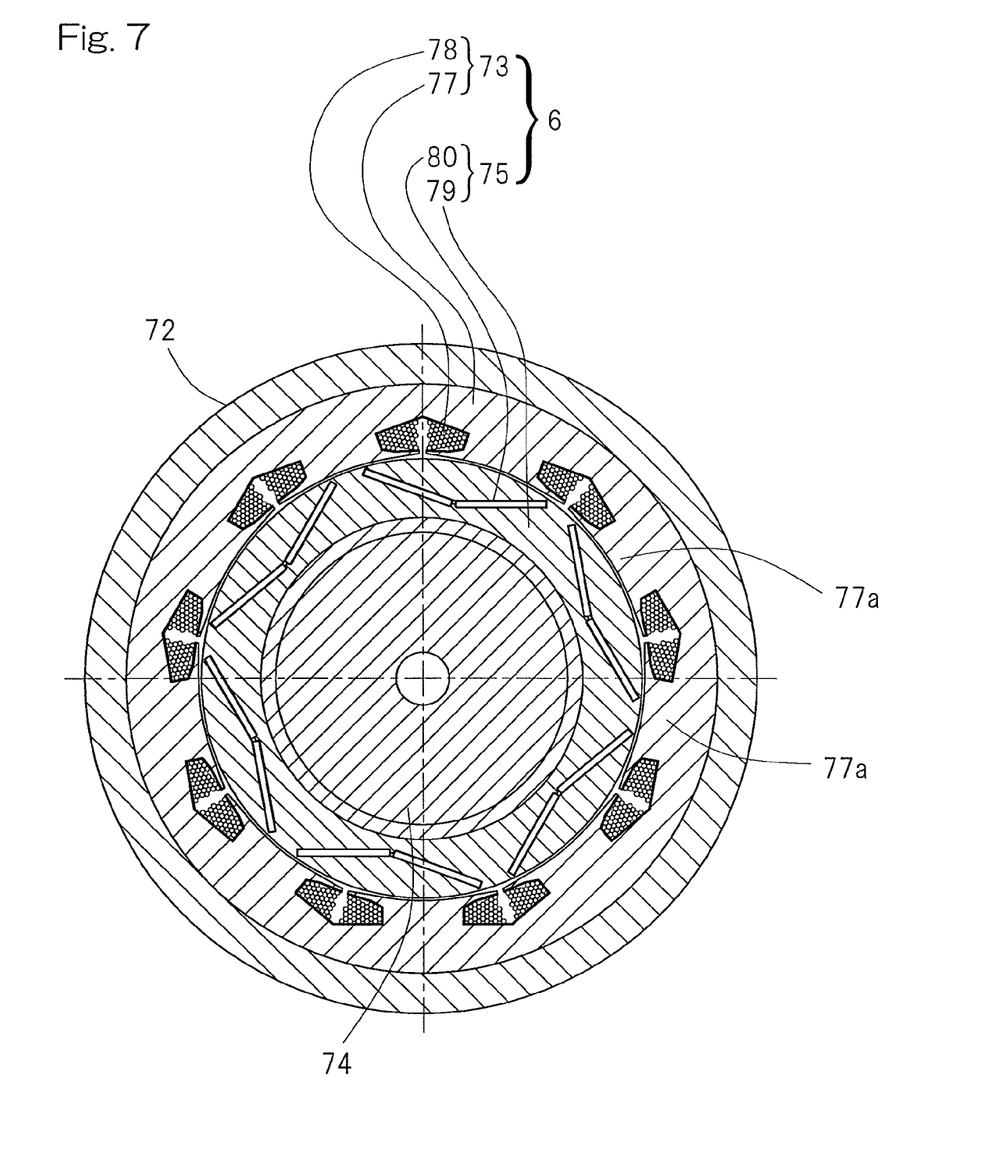
FIG. 7 is a longitudinal cross-sectioned view of FIG. 6 taken along the line VII-VII, illustrating a motor unit.

FIG. 7 shows a cross sectioned view of a motor (taken along the line VII-VII in FIG. 6). The rotor 75 of the motor unit 6 may include a core body 79 made of soft magnetic material and may also include a permanent magnet structure 80 incorporated in the core body 79. The permanent magnet structure 80 may include permanent magnets including pairs of two neighboring opposed permanent magnets arranged in circular fashion in the rotor core body 79, where, in each of the pairs, the distance between two neighboring opposed permanent magnets increases along a length of the opposed permanent magnets, as viewed in a cross section thereof. The permanent magnet structure 80 may include a neodymium magnet. The motor stator 73 may include a core body 77 made of soft magnetic material and may also include motor coils 78. The core body 77 has a ring-shaped outer peripheral surface having a circular cross section. The core body 77 also has an inner peripheral surface having a circumferentially arranged plurality of teeth 77a formed therein that are protruding radially inwards. The motor coils 78 are wound around the corresponding teeth 77a of the stator core body 77.

The motor unit 6 as shown in FIG. 6 is associated with an angle sensor 36 configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70. The angle sensor body 70 includes a detectable element 70a associated with the outer peripheral surface of the rotational output shaft 74 and also includes a detector element 70b associated with the motor housing 72. For example, the detector element 70b may be positioned adjacent to the detectable element 70a in a radially opposed fashion. The detectable element 70a and the detector element 70b may be positioned adjacent to each other in an axially opposed fashion. Here, the angle sensor 36 may include a resolver. To maximize the efficiency of the motor unit 6, the motor drive controller 33 of the motor control circuitry 29 may be configured to control the timings at which respective phase alternating currents are supplied to the motor coils 78 of the motor stator 73, based on the rotational angle of the motor rotor 75 relative to the motor stator 73 as sensed by the angle sensor 36. A connector 99 may be formed at the motor housing 72 for connection of the wires for a motor current in the in-wheel motor drive system 8, wires for various sensors, wires for various commands, and etc.

Figure 8:
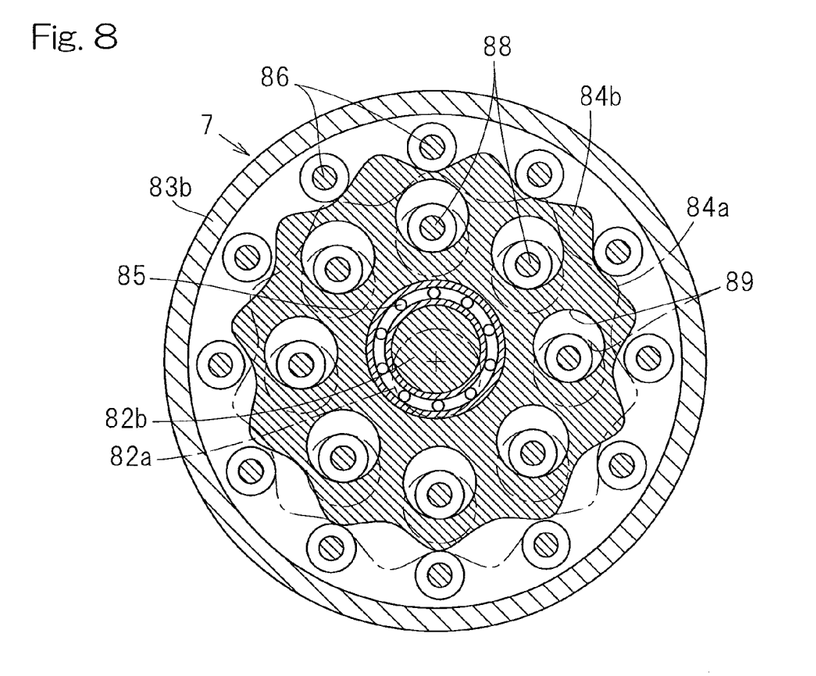
FIG. 8 is a longitudinal cross-sectioned view of FIG. 6 taken along the line VIII-VIII, illustrating a reducer unit.

The reducer unit 7 includes a cycloidal reducer as described. As shown in FIG. 8, the cycloidal reducer includes two curvilinear plates 84a, 84b, each having an outer contour defined by a smoothly corrugated trochoidal curve, that are mounted via the respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. The rotational input shaft 82 is supported on both sides thereof, via two bearings 90, by the inboard housing 83a and by an inner diameter surface of the inboard member 60 of the inner member 52.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage cycloidal reducer having such a configuration can achieve a reduction ratio of 10 or greater.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

Figure 9:
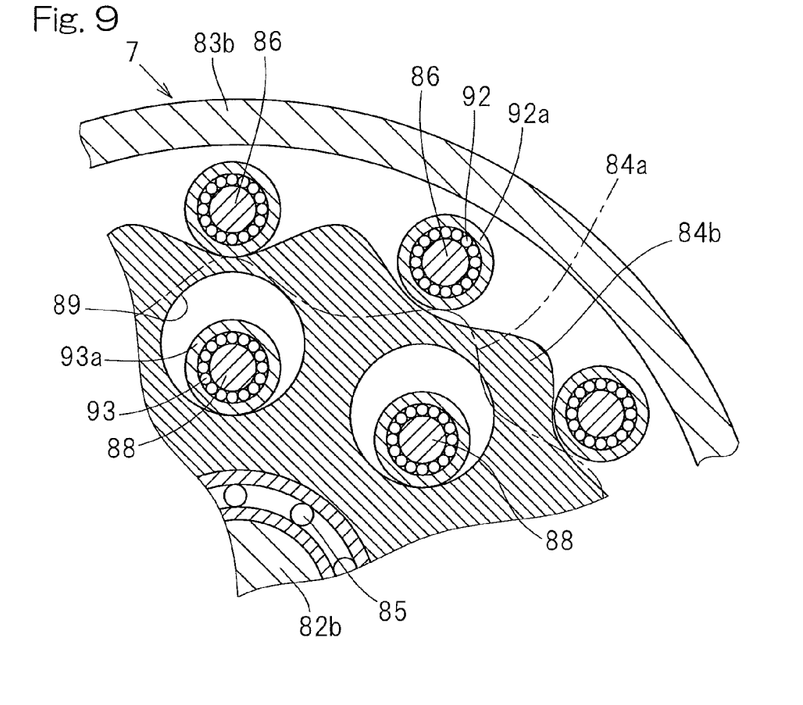
FIG. 9 is a fragmentary enlarged cross-sectioned view of FIG. 8.

As shown on an enlarged scale in FIG. 9, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

The wheel bearing unit 4 of the in-wheel motor drive system 8 as shown in FIG. 6 is secured to a vehicle body through the connection between a suspension system (not shown) such as a knuckle and the housing 83b of the reducer unit 7 or an outer periphery of the housing 72 of the motor unit 6.

Reliability of the wheel bearing unit 4, the reducer unit 7 and the motor unit 6 is an urgent concern for the in-wheel motor drive system 8 which, due to its smaller size, involves reduction of materials to be used and rapid rotation of the motor unit 6. In particular, the temperature of the motor coil 78 is sensed and a current for the motor unit 6 is limited according to the sensed temperature Tc, whereby the temperature of the motor can be minutely controlled, and deterioration in insulation performance of the motor coil 78 can be prevented.

The reducer unit 7 in the in-wheel motor drive system 8 may be a cycloidal reducer having, for example, a reduction ratio of 4 or greater. This allows for the provision of a smaller motor unit 6, thus achieving reduction in dimensions of the system. With such a significant reduction ratio, a smaller motor unit 6 may involve rapid rotation. Since an abnormality such as deterioration in insulation performance of the motor coil 78 of the motor unit 6 can be early sensed according to invention, during rapid rotation of the motor unit 6 appropriate measures can be quickly taken.

Figure 10:
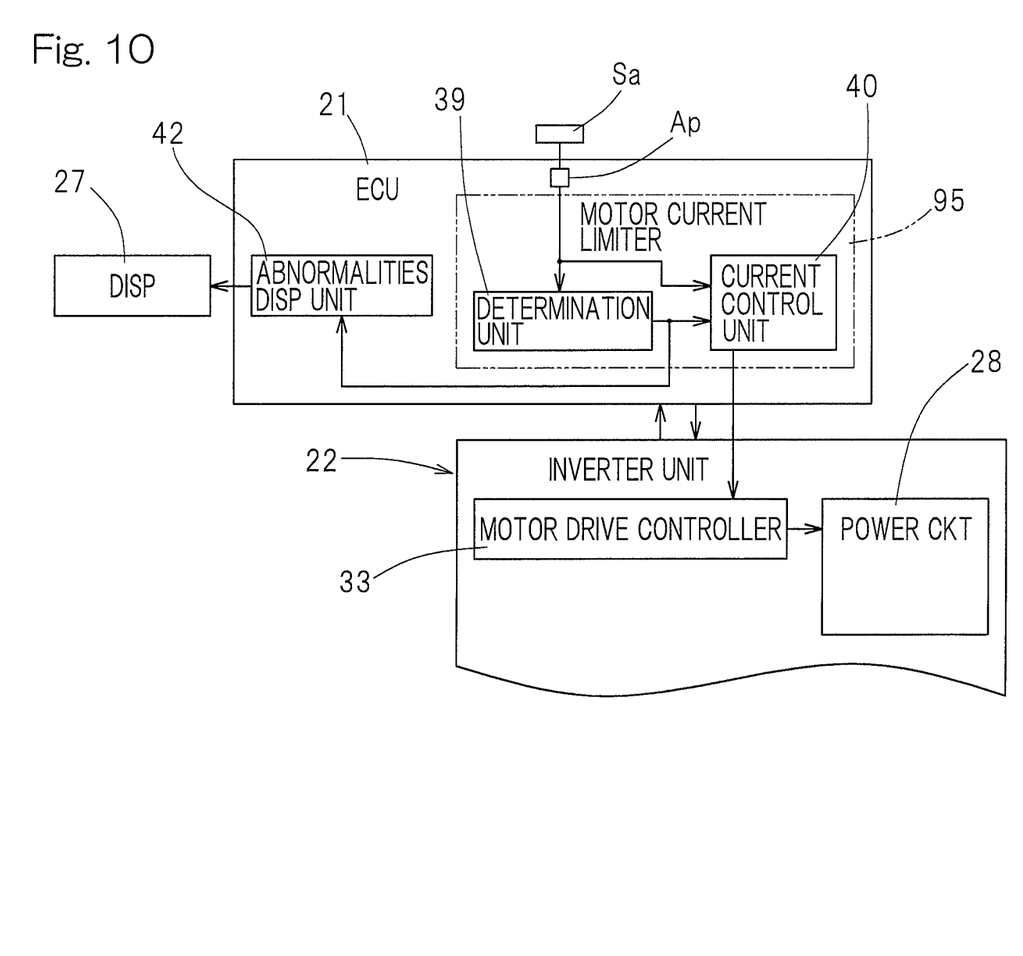
FIG. 10 is a block diagram of a schematic configuration of an ECU for an electric vehicle according to a second embodiment of the present invention.

A current for the motor unit 6 may be reduced by a predefined rate as describe above, for example, by a several percent of the total motor current value with each elapsed time. Alternatively, the motor current value may be reduced by the rate, which rate is slightly increased with each elapsed time. As shown in FIG. 10, the motor current limiter 95 may be disposed in the ECU 21 that serves as an electronic control unit for performing general control of the vehicle.

Although the present invention has been described in connection with preferred embodiments and applications thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2: Wheel
4: Wheel bearing unit
6: Motor unit
7: Reducer unit
8: In-wheel motor drive system
21: ECU
39: Determination unit
40: Current control unit
41: Abnormalities notifier
78: Motor coil
95: Motor current limiter
Sa: Temperature sensor
U1: Control device

What is claimed is:

1. A motor control device of controlling a motor unit that drives a wheel, the motor unit being provided in an electric vehicle, the motor control device comprising:
   a temperature sensor that is associated with a motor coil of the motor unit and is configured to sense a temperature Tc of the motor coil; and
   a motor current limiter configured to set a plurality of threshold values of the temperature Tc sensed by the temperature sensor, to set current limiting conditions that are different from each other for respective sectioned temperature ranges defined by the threshold values, and to limit a current for the motor unit according to the current limiting condition for the temperature range to which the temperature Tc having been sensed belongs,
   wherein, if a time difference $dTc/dt$ of a motor coil temperature obtained by differentiating the temperature Tc with respect to a time t indicates a positive value, the motor current limiter allows an allowable upper limit of the time difference $dTc/dt$ of the motor coil temperature to vary depending on the sectioned temperature ranges, and
   the motor current limiter sets, for the respective temperature ranges to one of which the temperature Tc having been sensed belongs, the allowable upper limits of the time difference $dTc/dt$ of the motor coil temperature obtained by differentiating the temperature Tc with respect to the time t so that the allowable upper limit for the temperature range with higher temperature is smaller than the allowable upper limit for the temperature range with lower temperature.

2. The motor control device as claimed in claim 1, wherein the motor current limiter limits the $dTc/dt$ by controlling a current for the motor unit.

3. The motor control device as claimed in claim 1, wherein the motor current limiter includes a determination unit configured to determine whether or not the temperature Tc sensed by the temperature sensor exceeds one of the threshold values,
   the motor control device further comprising:
   an abnormalities notifier configured to send, when the determination unit determines that the temperature Tc having been sensed exceeds a predetermined threshold value among the plurality of threshold values, information indicating an abnormality of the motor unit, to an ECU that serves as an electronic control unit for performing general control of the vehicle.

4. The motor control device as claimed in claim 1, wherein the motor unit operates to individually drive a wheel of the electric vehicle.

5. The motor control device as claimed in claim 4, further comprising an in-wheel motor drive system configured to have the motor unit that is partly or entirely disposed within the wheel.

6. The motor control device as claimed in claim 5, wherein the in-wheel motor drive system includes the motor unit, a wheel bearing unit and a reducer unit.

7. The motor control device as claimed in claim 1, further comprising a reducer unit configured to reduce a speed of rotation of the motor unit,
   wherein the reducer unit includes a cycloidal reducer having a high reduction ratio of 4 or greater.

* * * * *